(12) United States Patent
Toida et al.

(10) Patent No.: US 11,431,007 B2
(45) Date of Patent: Aug. 30, 2022

(54) FUEL CELL SYSTEM

(71) Applicant: TOYOTA JIDOSHA KABUSHIKI KAISHA, Toyota (JP)

(72) Inventors: Masashi Toida, Nagoya (JP); Mahiro Ozeki, Nisshin (JP); Yusuke Nishida, Nisshin (JP); Ryouichi Namba, Kazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/207,832

(22) Filed: Mar. 22, 2021

(65) Prior Publication Data

US 2021/0367251 A1 Nov. 25, 2021

(30) Foreign Application Priority Data

May 22, 2020 (JP) .............................. JP2020-089555

(51) Int. Cl.
| | |
|---|---|
| *H01M 8/04* | (2016.01) |
| *H01M 8/04223* | (2016.01) |
| *H01M 8/04007* | (2016.01) |
| *H01M 8/04225* | (2016.01) |
| *H01M 8/04701* | (2016.01) |
| *H01M 8/04992* | (2016.01) |
| *H01M 8/0432* | (2016.01) |
| *H01M 8/04302* | (2016.01) |

(52) U.S. Cl.
CPC ..... *H01M 8/04268* (2013.01); *H01M 8/0432* (2013.01); *H01M 8/04067* (2013.01); *H01M 8/04225* (2016.02); *H01M 8/04302* (2016.02); *H01M 8/04701* (2013.01); *H01M 8/04992* (2013.01)

(58) Field of Classification Search
CPC ......... H01M 8/04268; H01M 8/04225; H01M 8/04302; H01M 8/04067
See application file for complete search history.

(56) References Cited

U.S. PATENT DOCUMENTS

2015/0349360 A1 12/2015 Hoshi
2016/0141685 A1* 5/2016 Toida ................ H01M 8/04522
429/444

FOREIGN PATENT DOCUMENTS

JP 2017195021 A 10/2017
WO 2014109239 A1 7/2014

* cited by examiner

*Primary Examiner* — Olatunji A Godo
(74) *Attorney, Agent, or Firm* — Dickinson Wright, PLLC (57) ABSTRACT

A fuel cell system includes a fuel cell stack, a temperature measurement unit, and a controller. The controller is configured to, when the stack temperature is equal to or lower than a predetermined first threshold temperature at the time of startup of the fuel cell system, control a heat generation amount per unit time of the fuel cell stack to a set heat generation amount to perform a warming-up operation until the stack temperature increases to a target temperature, and when the stack temperature is equal to or higher than a predetermined second threshold temperature, execute at least one of setting the target temperature to be lower than the target temperature when the stack temperature is lower than the second threshold temperature and setting the set heat generation amount to be smaller than the set heat generation amount when the stack temperature is lower than the second threshold temperature.

3 Claims, 4 Drawing Sheets

FUEL CELL SYSTEM

CROSS-REFERENCE TO RELATED APPLICATION

This application claims priority to Japanese Patent Application No. 2020-089555 filed on May 22, 2020, incorporated herein by reference in its entirety.

BACKGROUND

1. Technical Field

The present disclosure relates to a fuel cell system.

2. Description of Related Art

In a fuel cell system, a technique is known that, at the time of startup at a temperature of a fuel cell stack below a freezing point, performs control such that an accessory component, such as an air compressor or a valve, provided in a flow passage of cathode gas decreases a supply amount of cathode gas, for example, air to be supplied to the fuel cell stack to perform power generation with low efficiency, and performs a warming-up operation to warm up the fuel cell stack. Japanese Unexamined Patent Application Publication No. 2017-195021 (JP 2017-195021 A) describes a technique that performs a warming-up operation until a temperature of a fuel cell stack, for example, a temperature of a cooling medium at a fuel cell stack outlet reaches a predetermined temperature.

SUMMARY

In a state in which the temperature of the fuel cell stack at the time of startup is higher than a given temperature, a possibility that the fuel cell stack is frozen is low compared to a state in which the temperature of the fuel cell stack is low. For this reason, it has been newly found that there is a room for improvement on efficiency of a warming-up operation in such a manner such that the warming-up operation is performed depending on a possibility of freezing.

The present disclosure has been accomplished to solve the above-described problem, and can be realized as the following aspects.

An aspect of the present disclosure relates to a fuel cell system. The fuel cell system includes a fuel cell stack, a temperature measurement unit configured to acquire a stack temperature, which is a temperature of the fuel cell stack, and a controller configured to control the fuel cell system. The controller is configured to, when the stack temperature is equal to or lower than a predetermined first threshold temperature at a time of startup of the fuel cell system, control a heat generation amount per unit time of the fuel cell stack to a set heat generation amount to perform a warming-up operation until the stack temperature increases to a target temperature, and when the stack temperature is equal to or higher than a predetermined second threshold temperature, execute at least one of processing of setting the target temperature to be lower than the target temperature when the stack temperature is lower than the second threshold temperature and processing of setting the set heat generation amount to be smaller than the set heat generation amount when the stack temperature is lower than the second threshold temperature. For this reason, the warming-up operation can be performed efficiently compared to an aspect where the warming-up operation is performed with a fixed target temperature and a fixed set heat generation amount regardless of a level of stack temperature.

Note that the present disclosure can be realized in various aspects, and for example, can be realized in aspects of a power generation device including a fuel cell system, a vehicle including a fuel cell system, a control method of a fuel cell system, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
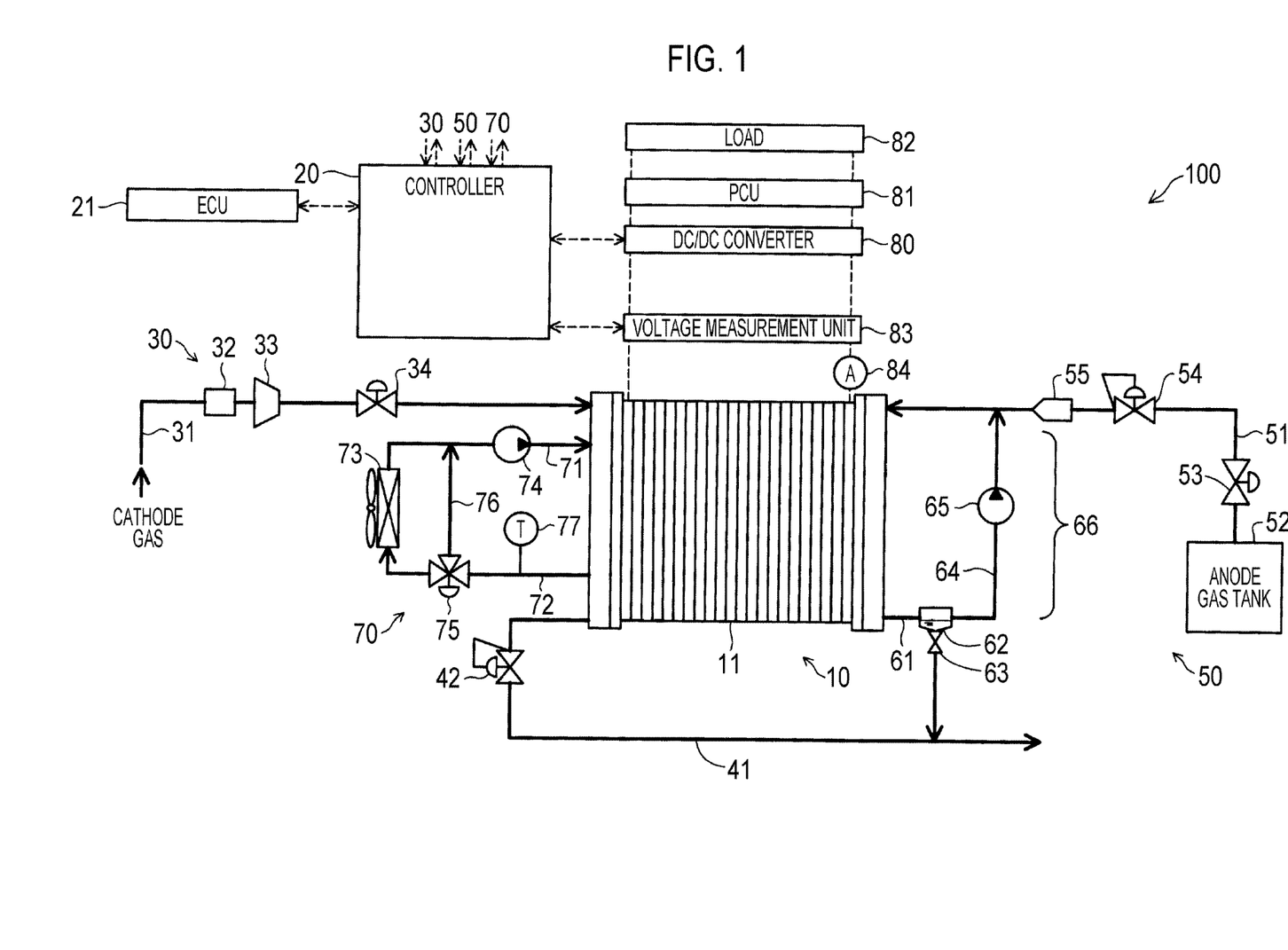
FIG. 1 is a diagram showing the schematic configuration of a fuel cell system.

FIG. 1 is a diagram showing the schematic configuration of a fuel cell system 100 in an embodiment of the present disclosure. The fuel cell system 100 includes a fuel cell stack 10, a controller 20, a cathode gas supply unit 30, an anode gas supply unit 50, and a cooling medium circulation unit 70. Furthermore, the fuel cell system 100 includes a DC/DC converter 80, a power control unit (hereinafter, referred to as "PCU 81") 81, a load 82, a voltage measurement unit 83, and an ammeter 84. The fuel cell system 100 of the embodiment is mounted in, for example, a fuel cell vehicle.

The fuel cell stack 10 is a solid polymer fuel cell that generates power with supply of anode gas (for example, hydrogen gas) and cathode gas (for example, air) as reactant gas. The fuel cell stack 10 has a configuration in which a plurality of unit cells 11 is laminated. Each unit cell 11 has a membrane electrode assembly (not shown) in which an anode (not shown) and a cathode (not shown) are disposed on both surfaces of an electrolyte membrane (not shown), and a set of separators (not shown) that sandwiches the membrane electrode assembly.

The controller 20 is configured as a computer including a CPU, a memory, and an interface circuit to which each component described below is connected. The controller 20 outputs signals for controlling activation and stop of each equipment in the fuel cell stack 10 in response to an instruction of an electronic control unit (ECU) 21. The controller 20 controls power generation in the fuel cell system 100 and performs a warming-up operation to warm up the fuel cell stack 10 by executing a control program stored in the memory. The "warming-up operation" is processing in which the controller 20 performs control such that the cathode gas supply unit 30 or the anode gas supply unit 50 sets a heat generation amount of the fuel cell stack 10 to a predetermined set heat generation amount per unit time until a stack temperature increases to a predetermined target temperature. The controller 20 performs the warming-up operation depending on the stack temperature, for example, at the time of startup of the fuel cell system 100. Note that, in the controller 20, a part or the whole of such control may be realized as hardware circuits.

The ECU 21 is a controller that performs control of the entire device (for example, a vehicle) including the fuel cell system 100. For example, in a fuel cell vehicle, the ECU 21 executes control of the vehicle according to a plurality of input values, such as a depression amount of an accelerator pedal, a depression amount of a brake pedal or the like, and a vehicle speed. Note that the ECU 21 may be included in a part of the functions of the controller 20.

The cathode gas supply unit 30 includes a cathode gas pipe 31, an air flowmeter 32, a compressor 33, a first on-off valve 34, a cathode off-gas pipe 41, and a first regulator 42. The cathode gas pipe 31 is connected to the fuel cell stack 10 and supplies air taken from the outside to the fuel cell stack 10.

The air flowmeter 32 is provided in the cathode gas pipe 31 and measures a supply amount of taken air. The compressor 33 compresses air taken from the outside and supplies air as cathode gas to the fuel cell stack 10 according to a control signal from the controller 20. The compressor 33 consumes electric power to be driven. The first on-off valve 34 is provided between the compressor 33 and the fuel cell stack 10.

The cathode off-gas pipe 41 discharges cathode off-gas discharged from the fuel cell stack 10 to the outside the fuel cell system 100. The first regulator 42 adjusts pressure of a cathode gas outlet of the fuel cell stack 10 according to a control signal from the controller 20.

The anode gas supply unit 50 includes an anode gas pipe 51, an anode gas tank 52, a second on-off valve 53, a second regulator 54, an injector 55, an anode off-gas pipe 61, a gas-liquid separator 62, an exhaust and drain valve 63, a circulation pipe 64, and an anode gas pump 65. In the following description, a flow passage formed by a portion of the anode gas pipe 51 downstream of the injector 55, a flow passage of anode gas in the fuel cell stack 10, the anode off-gas pipe 61, the gas-liquid separator 62, the circulation pipe 64, and the anode gas pump 65 is referred to as a circulation flow passage 66. The circulation flow passage 66 is a flow passage through which anode off-gas of the fuel cell stack 10 is circulated to the fuel cell stack 10.

The anode gas tank 52 is connected to an anode gas inlet of the fuel cell stack 10 through the anode gas pipe 51 and supplies anode gas to the fuel cell stack 10. The second on-off valve 53, the second regulator 54, and the injector 55 are provided in the anode gas pipe 51 from an upstream side, that is, a side close to the anode gas tank 52 in this order.

The second on-off valve 53 is opened and closed according to a control signal from the controller 20. The second on-off valve 53 is closed when the fuel cell system 100 is stopped. The second regulator 54 adjusts anode gas pressure upstream of the injector 55 according to a control signal from the controller 20. The injector 55 is an electromagnetic on-off valve in which a valve body is electromagnetically driven according to a drive period or a valve opening time set by the controller 20. The controller 20 controls a supply amount of anode gas to be supplied to the fuel cell stack 10 by controlling the drive period or the valve opening time of the injector 55.

The anode off-gas pipe 61 is a pipe that connects an anode gas outlet of the fuel cell stack 10 and the gas-liquid separator 62. The anode off-gas pipe 61 guides anode off-gas including hydrogen gas, nitrogen gas, or the like not used in a power generation reaction to the gas-liquid separator 62.

The gas-liquid separator 62 is connected between the anode off-gas pipe 61 and the circulation pipe 64 of the circulation flow passage 66. The gas-liquid separator 62 separates, from gas discharged from the fuel cell stack 10, at least a part of water liquid included in gas. More specifically, the gas-liquid separator 62 separates and stores water as an impurity from anode off-gas in the circulation flow passage 66.

The exhaust and drain valve 63 is provided below the gas-liquid separator 62. The exhaust and drain valve 63 performs draining of water stored in the gas-liquid separator 62 and exhaust of unneeded gas (primarily, nitrogen gas) in the gas-liquid separator 62. The exhaust and drain valve 63 is usually closed during the operation of the fuel cell system 100, and is opened and closed according to a control signal from the controller 20. In the embodiment, the exhaust and drain valve 63 is connected to the cathode off-gas pipe 41, and water and unneeded gas discharged by the exhaust and drain valve 63 are discharged to the outside through the cathode off-gas pipe 41.

The circulation pipe 64 is connected to a portion of the anode gas pipe 51 downstream of the injector 55. The circulation pipe 64 is provided with the anode gas pump 65 that is driven according to a control signal from the controller 20. Anode off-gas from which water is separated by the gas-liquid separator 62 is pumped to the anode gas pipe 51 by the anode gas pump 65. In the fuel cell system 100, anode off-gas containing hydrogen is circulated and supplied to the fuel cell stack 10 again, thereby improving the use efficiency of anode gas.

The cooling medium circulation unit 70 adjusts the temperature of the fuel cell stack 10 by circulating a cooling medium through the fuel cell stack 10. The cooling medium circulation unit 70 includes a cooling medium supply pipe 71, a cooling medium discharge pipe 72, a radiator 73, a cooling medium pump 74, a three-way valve 75, a bypass pipe 76, and a temperature measurement unit 77. As the cooling medium, for example, water, unfreezing water, such as ethylene glycol, or air is used.

The cooling medium supply pipe 71 is connected to a cooling medium inlet in the fuel cell stack 10, and the cooling medium discharge pipe 72 is connected to a cooling medium outlet of the fuel cell stack 10. The radiator 73 is connected to the cooling medium discharge pipe 72 and the cooling medium supply pipe 71, cools the cooling medium flowing from the cooling medium discharge pipe 72 with wind from an electric fan, or the like, and then, discharges the cooling medium to the cooling medium supply pipe 71. The cooling medium pump 74 is provided in the cooling medium supply pipe 71 and pumps the cooling medium to the fuel cell stack 10. The three-way valve 75 adjusts a supply amount of the cooling medium to the radiator 73 and the bypass pipe 76. The temperature measurement unit 77 is connected to the cooling medium discharge pipe 72 and measures a temperature of the cooling medium discharged from the fuel cell stack 10. The temperature measured by the temperature measurement unit 77 is substantially equal to the stack temperature of the fuel cell stack 10. Accordingly, the temperature measurement unit 77 corresponds to a temperature measurement unit that measures the stack temperature of the fuel cell stack 10.

The DC/DC converter 80 boosts an output voltage of the fuel cell stack 10 and supplies the boosted voltage to the PCU 81. The PCU 81 incorporates an inverter and supplies electric power to the load 82 through the inverter under the control of the controller 20. Furthermore, the PCU 81 limits a current of the fuel cell stack 10 under the control of the controller 20. The voltage measurement unit 83 measures the output voltage of the fuel cell stack 10. The ammeter 84 measures an output current of the fuel cell stack 10.

Electric power of the fuel cell stack 10 is supplied to the load 82, such as a traction motor (not shown) that drives wheels (not shown), or an accessory through a power supply circuit including the PCU 81. In the embodiment, the "accessory" is equipment that consumes generated electric power of the fuel cell stack 10 to be driven. For example, the accessory represents the compressor 33 or the anode gas pump 65, a heating device (not shown) that heat a vehicle cabin of the fuel cell vehicle mounted with the fuel cell system 100, a heater (not shown) that is provided in the cooling medium circulation unit 70 and warms up the cooling medium of the fuel cell stack 10, or the like.

Figure 2:
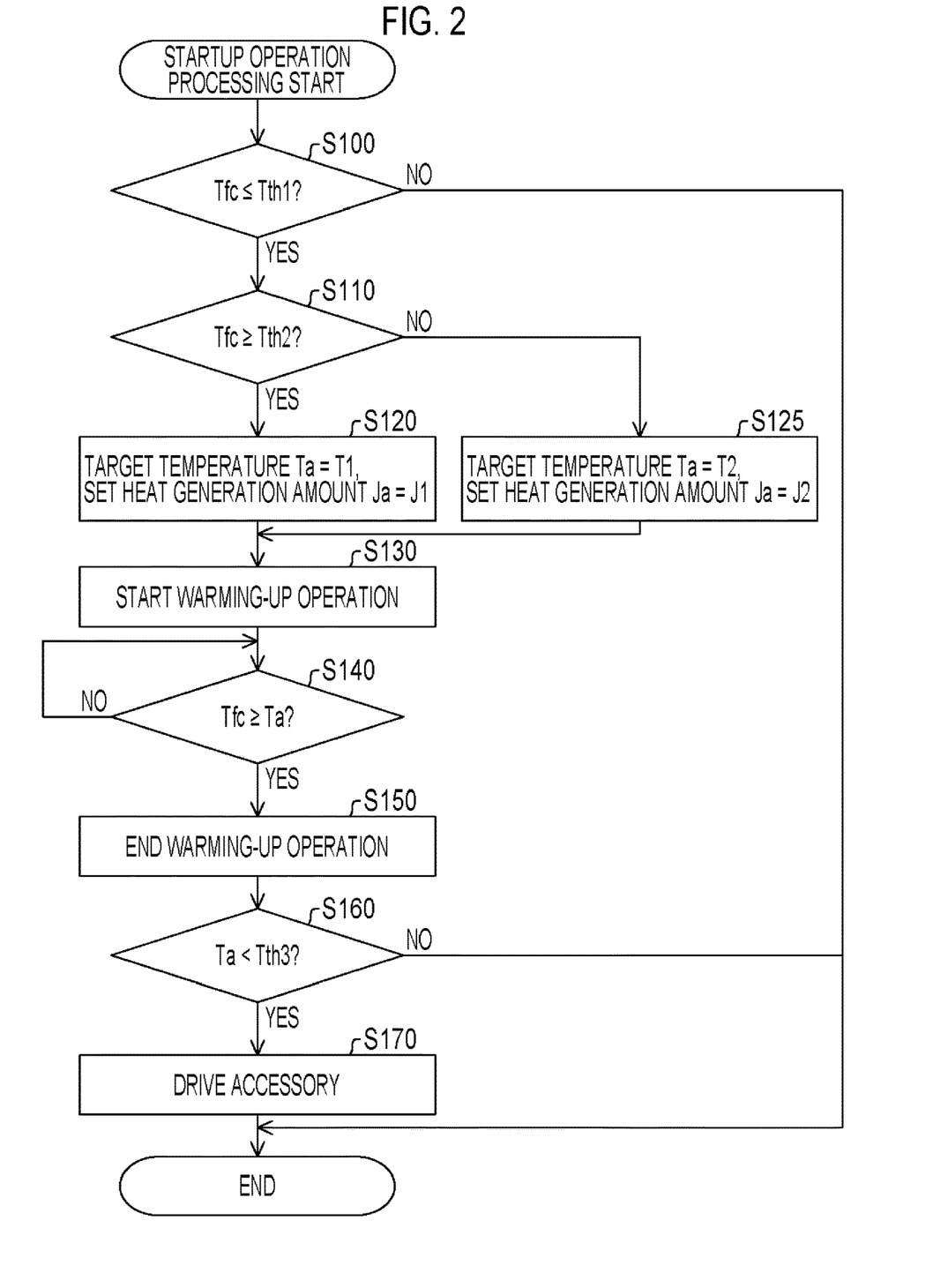
FIG. 2 is a flowchart showing an example of a procedure of startup operation processing.

Startup operation processing of the fuel cell system 100 will be described referring to FIGS. 2 and 3. FIG. 2 is a flowchart showing an example of a procedure of startup operation processing in the embodiment. The startup operation processing is processing in which the controller 20 performs the warming-up operation when the stack temperature is equal to or lower than a predetermined first threshold temperature at the time of startup of the fuel cell system 100. The controller 20 executes the processing at the time of startup of the fuel cell system 100.

Figure 3:
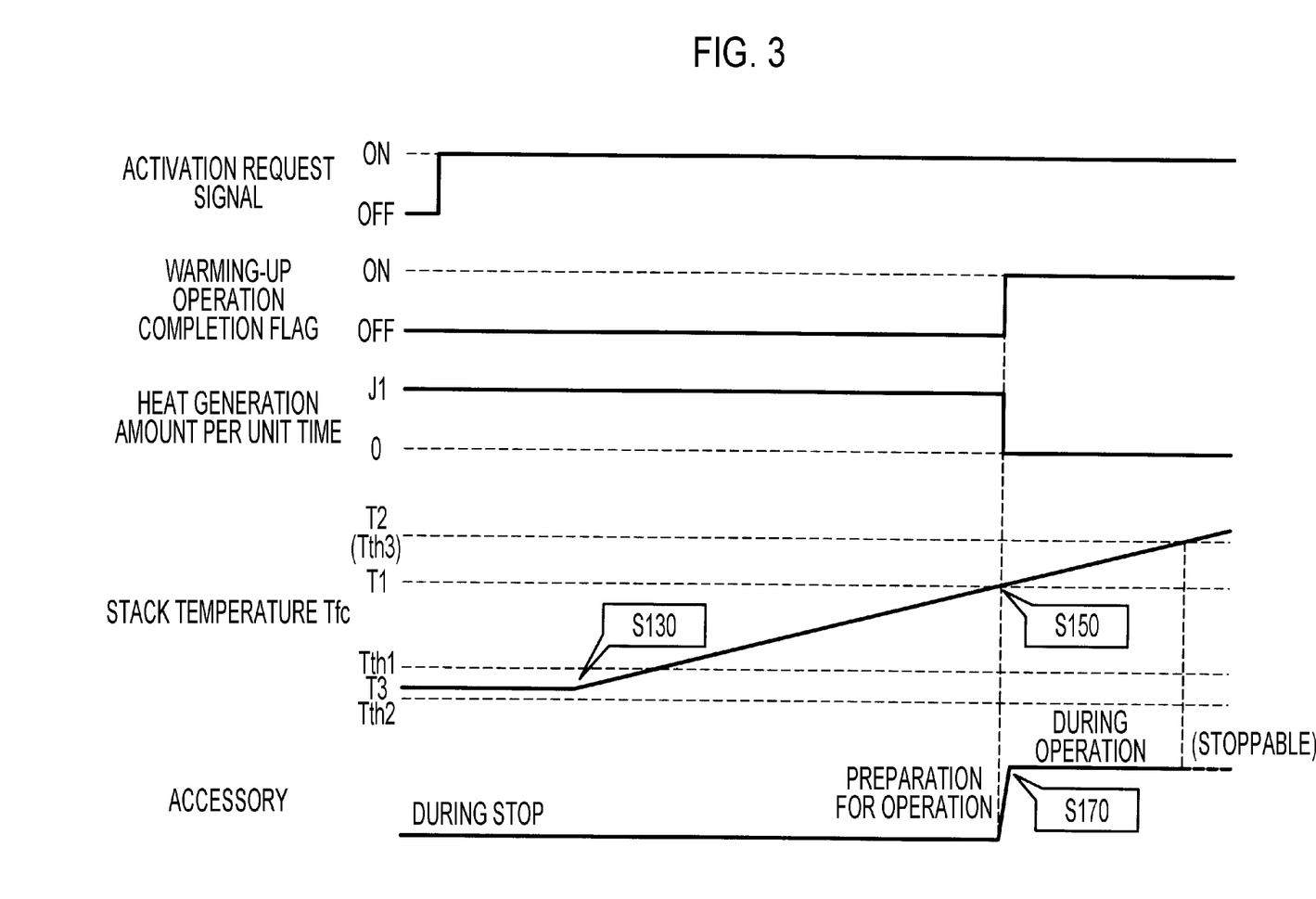
FIG. 3 is an explanatory view showing an example of a timing chart in the startup operation processing.

FIG. 3 is an explanatory view showing an example of a timing chart that shows ON/OFF of an activation request signal, a warming-up operation completion flag, a heat generation amount per unit time, a stack temperature, and an operation state of an accessory. Here, the accessory is a heater that warms up the cooling medium of the fuel cell stack 10. In FIG. 3, in regard to the warming-up operation completion flag, "ON" means that the warming-up operation is completed, and "OFF" means that the warming-up operation is not completed. FIG. 3 is a timing chart when a stack temperature Tfc when the startup operation processing starts is a temperature T3 equal to or higher than a second threshold temperature described below, and an execution timing of each of Steps S130, S150, and S170 shown in FIG. 2 is indicated by a balloon.

In Step S100, the controller 20 determines whether or not the stack temperature Tfc acquired from the temperature measurement unit 77 is equal to or lower than a predetermined first threshold temperature Tth1. The first threshold temperature Tth1 is a temperature at which moisture in the fuel cell stack 10 is frozen, and can be set to, for example, 0° C. When the stack temperature Tfc is equal to or lower than the first threshold temperature Tth1, the controller 20 progresses the process to Step S110. On the other hand, when the stack temperature Tfc is higher than the first threshold temperature Tth1, the controller 20 ends the startup operation processing.

In Step S110, the controller 20 determines whether or not the stack temperature Tfc acquired from the temperature measurement unit 77 is equal to or higher than a predetermined second threshold temperature Tth2. The second threshold temperature Tth2 can be set by performing a simulation or an experiment in advance. The second threshold temperature Tth2 can be set to a value lower than 0° C., and can be set to, for example, −5° C. The second threshold temperature Tth2 may be set based on a function or a map in which a relationship between the stack temperature when the warming-up operation starts and a time needed for the warming-up operation is defined. When the stack temperature is equal to or higher than the second threshold temperature Tth2, the controller 20 progresses the process to Step S120. On the other hand, when the stack temperature Tfc is lower than the second threshold temperature Tth2, the controller 20 progresses the process to Step S125.

In Step S120, the controller 20 sets a target temperature Ta and a set heat generation amount Ja, which is a heat generation amount per unit time, during the warming-up operation. In the embodiment, the controller 20 decides the target temperature Ta to a temperature T1 and decides the set heat generation amount Ja to a heat amount J1. The target temperature Ta is a temperature experimentally determined in advance and can be optionally determined. Alternatively, the controller 20 may determine the target temperature Ta based on a map or a function in which a relationship between the stack temperature Tfc and the target temperature Ta when the warming-up operation starts is defined. The target temperature Ta can be set to be lower as the stack temperature Tfc is higher. The temperature T1 can be set to, for example, 40° C. Furthermore, the set heat generation amount Ja is the heat amount J1 per unit time experimentally determined in advance and can be optionally determined. Alternatively, the controller 20 may determine the set heat generation amount Ja based on a map or a function in which a relationship between the stack temperature Tfc and the set heat generation amount Ja is defined. The set heat generation amount Ja can be set to be smaller as the stack temperature Tfc is higher. The heat amount J1 can be set to, for example, 20 kW.

In Step S125, the controller 20 sets the target temperature Ta and the set heat generation amount Ja during the warming-up operation. In the embodiment, the controller 20 decides the target temperature Ta to a temperature T2 higher than temperature T1 and decides the set heat generation amount Ja to a heat amount J2 greater than the heat amount J1. The temperature T2 can be set to, for example, 65° C. The heat amount J2 can be set to, for example, 50 kW.

In Step S130, the controller 20 starts the warming-up operation. More specifically, the controller 20 performs control such that the cathode gas supply unit 30 makes the stack temperature Tfc reach the target temperature Ta set in Step S120 or S125 and makes the heat amount per unit time generated from the fuel cell stack 10 be the set heat generation amount Ja set in Step S120 or S125. For example, the controller 20 performs control such that the cathode gas supply unit 30 makes an amount of cathode gas supplied to the fuel cell stack 10 smaller than an amount of cathode gas during a normal operation, and performs the warming-up operation. The warming-up operation increases the stack temperature Tfc as shown in FIG. 3.

In Step S140, the controller 20 determines whether or not the stack temperature Tfc is equal to or higher than the target temperature Ta determined in Step S120 or S125. That is, the controller 20 determines whether or not the stack temperature Tfc increases to the target temperature Ta. When the stack temperature Tfc is equal to or higher than the target temperature Ta, the controller 20 progresses the process to Step S150. On the other hand, when the stack temperature Tfc is lower than the target temperature Ta, the controller 20 returns to the processing of Step S140. That is, Step S140 is repeated until warming-up of the fuel cell stack 10 is completed.

In Step S150, the controller 20 ends the warming-up operation started in Step S130. That is, the controller 20 returns the fuel cell system 100 to a normal operation state.

Figure 4:
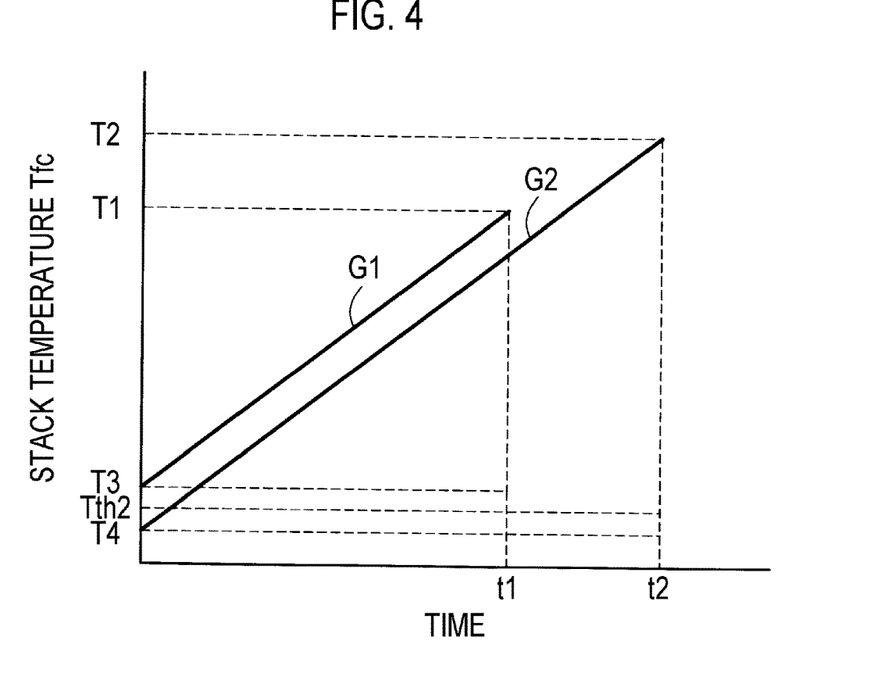
FIG. 4 is a graph showing change in stack temperature during a warming-up operation.

FIG. 4 is a graph showing change in stack temperature during the warming-up operation. In FIG. 4, a graph G1 is a graph showing when the stack temperature Tfc at the time of the start of the startup operation processing is the temperature T3 higher than the second threshold temperature Tth2, and the target temperature Ta is set to the temperature T1. A graph G2 is a graph showing when the stack temperature Tfc at the time of the start of the startup operation processing is a temperature T4 lower than the second threshold temperature Tth2, and the target temperature Ta is set to the temperature T2. Both the graph G1 and the graph G2 are a graph showing the warming-up operation performed with the set heat generation amount Ja set to the heat amount J1.

As shown in FIG. 4, the graph G1 shows that the stack temperature Tfc reaches the temperature T1 as the target temperature Ta at time t1. Furthermore, the graph G2 shows that the stack temperature Tfc reaches the temperature T2 as the target temperature Ta at time t2 longer than time t1. That is, as the target temperature Ta is set to be low, a time needed for the warming-up operation is shortened. That is, as the target temperature Ta when the stack temperature Tfc is equal to or higher than the second threshold temperature Tth2 is set to be lower than the target temperature Ta when the stack temperature Tfc is lower than the second threshold temperature Tth2, the warming-up operation is completed in a shorter time when the stack temperature Tfc is equal to or higher than the second threshold temperature Tth2 than when the stack temperature Tfc is lower than the second threshold temperature Tth2. For this reason, power generation loss can be suppressed, and thus, the warming-up operation can be performed efficiently.

Figure 5:
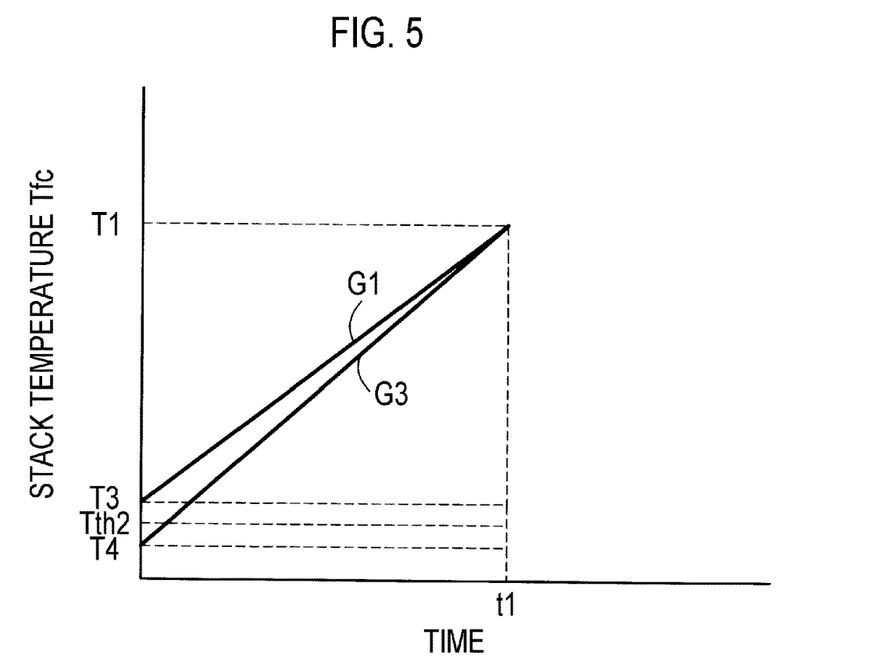
FIG. 5 is another graph showing change in stack temperature during the warming-up operation.

FIG. 5 is another graph showing change in stack temperature during the warming-up operation. In FIG. 5, a graph G1 is a graph showing when the stack temperature Tfc at the time of the start of the startup operation processing is the temperature T3 higher than the second threshold temperature Tth2, and the set heat generation amount Ja is set to the heat amount J1. A graph G3 is a graph showing when the stack temperature Tfc at the time of the start of the startup operation processing is the temperature T4 lower than the second threshold temperature Tth2, and the set heat generation amount Ja is set to the heat amount J2. Both the graph G1 and the graph G3 are a graph showing the warming-up operation performed with the target temperature Ta set to the temperature T1.

As shown in FIG. 5, the graph G1 and the graph G3 show that stack temperature Tfc reaches the temperature T1 as the target temperature Ta at time t1. That is, the heat amount J1 is a heat amount with which the stack temperature Tfc increases from the temperature T3 higher than the second threshold temperature Tth2 to the temperature T1 at time t1. Furthermore, the heat amount J2 is a heat amount with which the stack temperature Tfc increases from the temperature T4 lower than the second threshold temperature Tth2 to the temperature T1 at time t1. As the set heat generation amount Ja when the stack temperature Tfc is equal to or higher than the second threshold temperature Tth2 is set to be smaller than the set heat generation amount Ja when the stack temperature Tfc is lower than the second threshold temperature Tth2, power generation loss can be suppressed. For this reason, the warming-up operation can be performed efficiently.

In the embodiment, when the stack temperature Tfc at the time of the start of the startup operation processing is equal to or higher than the second threshold temperature Tth2, the warming-up operation is performed with the heat amount J1 given per unit time until the stack temperature Tfc increases to the temperature T1 (see S120 of FIG. 2). Since the warming-up operation is performed with the heat amount J1 smaller than the heat amount J2, there is no significant difference between the stack temperature Tfc and a temperature of a component other than the fuel cell stack 10, the flow passage, or the like compared to when the warming-up operation is performed with the heat amount J2, and the stack temperature Tfc and the temperature of a component other than the fuel cell stack 10, the flow passage, or the like gradually increases.

On the other hand, when the stack temperature Tfc at the time of the start of the startup operation processing is lower than the second threshold temperature Tth2, the warming-up operation is performed with the heat amount J2 greater than the heat amount J1 as the heat amount given per unit time until the stack temperature Tfc increases to the temperature T2 higher than the temperature T1 (see S125 of FIG. 2). Since the warming-up operation is performed with the heat amount J2 greater than the heat amount J1, while the stack temperature Tfc increases rapidly, the temperature of the component other than the fuel cell stack 10, the flow passage, or the like does not increase as much as the stack temperature Tfc. For this reason, the stack temperature Tfc is deviated from the temperature of a component other than the fuel cell stack 10, the flow passage, or the like compared to when the stack temperature Tfc at the time of the start of the startup operation processing is equal to or higher than the second threshold temperature Tth2. However, when the stack temperature Tfc at the time of the start of the startup operation processing is lower than the second threshold temperature Tth2, the target temperature Ta is set to be high, and thus, the warming-up operation can be performed until a component other than the fuel cell stack 10 or the flow passage is at a sufficiently high temperature.

In Step S160, the controller 20 determines whether or not the target temperature Ta determined in Step S120 or S125 is lower than a predetermined third threshold temperature Tth3. The third threshold temperature Tth3 is a temperature experimentally determined in advance and can be optionally determined. The third threshold temperature Tth3 is, for example, the temperature T2. When the target temperature Ta is lower than the third threshold temperature Tth3, the controller 20 progresses the process to Step S170. On the other hand, the target temperature Ta is equal to or higher than the third threshold temperature Tth3, the controller 20 ends the startup operation processing.

In Step S170, the controller 20 drives the accessory. More specifically, the controller 20 drives the heater as the accessory to make the fuel cell stack 10 generate heat and warms up the fuel cell stack 10 or the cooling medium of the fuel cell stack 10. For this reason, the fuel cell stack 10 or a component warmed up by the cooling medium of the fuel cell stack 10 is warmed up without depending on the warming-up operation, and such a state can be maintained for a given time. The controller 20 stops the heater, for example, when the stack temperature Tfc increases to the third threshold temperature Tth3. Note that the processing of Steps S160 and S170 may be omitted.

With the fuel cell system 100 of the embodiment described above, the controller 20 executes processing of setting the target temperature Ta when the stack temperature Tfc is equal to or higher than the second threshold temperature Tth2 to be lower than the target temperature Ta when the stack temperature Tfc is lower than the second threshold temperature Tth2, and processing of setting the set heat generation amount Ja to be smaller than the set heat generation amount Ja when the stack temperature Tfc is lower than the second threshold temperature Tth2. For this reason, power generation loss can be suppressed compared to an aspect where the warming-up operation is performed with the fixed target temperature Ta and the fixed set heat generation amount Ja regardless of the level of the stack temperature Tfc, and thus, the warming-up operation can be performed efficiently. Furthermore, the warming-up operation can be performed more efficiently compared to an aspect where one of the target temperature Ta and the set heat generation amount Ja is set to be low or small.

The controller 20 drives the accessory after the warming-up operation when the target temperature Ta is lower than the third threshold temperature Tth3. For this reason, the fuel cell stack can be warmed up by exhaust heat based on the drive of the accessory without depending on the warming-up operation. Therefore, the fuel cell stack can be warmed up more efficiently compared to an aspect where the accessory is not driven after the warming-up operation.

B. Other Embodiments (B1) In the above-described embodiment, when the stack temperature Tfc is equal to or higher than the second threshold temperature Tth2, the controller 20 sets the target temperature Ta and the set heat generation amount Ja to be lower or smaller than when stack temperature Tfc is lower than the second threshold temperature Tth2. Alternatively, when the stack temperature Tfc is equal to or higher than the second threshold temperature Tth2, the controller 20 may set the target temperature Ta and the set heat generation amount Ja to be lower or smaller than when the stack temperature Tfc is lower than the second threshold temperature Tth2. For example, when the stack temperature Tfc is equal to or higher than the second threshold temperature Tth2, the controller 20 sets the target temperature Ta to the temperature T1 and sets the set heat generation amount Ja to the heat amount J2. Furthermore, when the stack temperature Tfc is lower than the second threshold temperature Tth2, the controller 20 sets the target temperature Ta to the temperature T2 and sets the set heat generation amount Ja to the heat amount J2.

(B2) In the above-described embodiment, when the stack temperature Tfc is equal to or higher than the second threshold temperature Tth2, the controller 20 sets the target temperature Ta and the set heat generation amount Ja to be lower or smaller than when the stack temperature Tfc is lower than the second threshold temperature Tth2. That is, the target temperature Ta and the set heat generation amount Ja are set using one threshold value. Alternatively, the controller 20 may set the target temperature Ta and the set heat generation amount Ja using two different threshold values. When the stack temperature Tfc is equal to or higher than a second threshold temperature Tth2A, the controller 20 sets the target temperature Ta to be lower than when the stack temperature Tfc is lower than the second threshold temperature Tth2A. Furthermore, when the stack temperature Tfc is equal to or higher than a second threshold temperature Tth2B different from the second threshold temperature Tth2A, the controller 20 sets the set heat generation amount Ja to be smaller than when the stack temperature Tfc is lower than the second threshold temperature Tth2B.

(B3) In the above-described embodiment, when the fuel cell system 100 is mounted in the fuel cell vehicle, the controller 20 may determine at least one of the target temperature Ta and the set heat generation amount Ja depending on a shift position of the fuel cell vehicle when the stack temperature Tfc is lower than the second threshold temperature Tth2. For example, when the shift position is a non-traveling range (parking), the controller 20 sets at least one of the target temperature Ta and the set heat generation amount Ja to be lower or smaller than when the shift position is a traveling range (drive). As the set heat generation amount Ja is set to be small, power generation can be performed efficiently in the fuel cell stack 10. On the other hand, as the target temperature Ta is set to be low, the period of the warming-up operation during which low-efficiency power generation is performed is shortened. That is, power generation can be performed efficiently, and the fuel efficiency of the fuel cell vehicle mounted with the fuel cell system 100 is improved.

(B4) In the above-described embodiment, the controller 20 drives the accessory when the target temperature Ta is lower than the third threshold temperature Tth3 after the warming-up operation ends. Alternatively, the controller 20 may drive the accessory simultaneously with the start of the warming-up operation in Step S130. Furthermore, the controller 20 may drive the accessory simultaneously with the end of the warming-up operation in Step S150. In this case, in Step S160, the controller 20 determines whether or not the target temperature Ta is lower than the third threshold temperature Tth3, and when the target temperature Ta is higher than the third threshold temperature Tth3, stops the accessory.

(B5) In the above-described embodiment, the controller 20 acquires the temperature T1 measured by the temperature measurement unit 77 as the stack temperature Tfc of the fuel cell stack 10. Alternatively, the fuel cell system 100 may include a thermometer that directly measures the stack temperature Tfc of the fuel cell stack 10.

(B6) In the above-described embodiment, the controller 20 sets the set heat generation amount Ja depending on the stack temperature Tfc. Alternatively, the controller 20 may set a target value of the efficiency of the warming-up operation depending on the stack temperature Tfc. The efficiency of the warming-up operation is the power generation efficiency of the fuel cell stack 10 during the warming-up operation.

The present disclosure is not limited to the above-described embodiment, and can be realized by various configurations without departing from the scope of the disclosure. For example, the technical features in the aspect described in SUMMARY may be appropriately replaced or combined to solve the above-described problem or achieve a part or all of the above-described effects. Furthermore, unless the technical features are described as needed in the specification, such technical features may be deleted appropriately.

What is claimed is:
1. A fuel cell system comprising:
   a fuel cell stack;
   a temperature measurement unit configured to acquire a stack temperature, which is a temperature of the fuel cell stack; and
   a controller programmed to control the fuel cell system,
   wherein the controller is programmed to,
      when the stack temperature is equal to or lower than a predetermined first threshold temperature at a time of startup of the fuel cell system, control a heat generation amount per unit time of the fuel cell stack to a set heat generation amount to perform a warming-up operation until the stack temperature increases to a target temperature, the predetermined first threshold temperature being a temperature at which moisture in the fuel cell stack is frozen, and
      when the stack temperature is equal to or higher than a predetermined second threshold temperature that is a temperature lower than 0° C., execute at least one of

(i) setting the target temperature to be lower than the target temperature when the stack temperature is lower than the second threshold temperature, or
(ii) setting the set heat generation amount to be smaller than the set heat generation amount when the stack temperature is lower than the second threshold temperature.

2. The fuel cell system according to claim 1, wherein the controller is programmed to, when the stack temperature is equal to or higher than the second threshold temperature,
(i) set the target temperature to be lower than the target temperature when the stack temperature is lower than the second threshold temperature, and
(ii) set the set heat generation amount to be smaller than the set heat generation amount when the stack temperature is lower than the second threshold temperature.

3. A fuel cell system comprising:
a fuel cell stack;
a temperature measurement unit configured to acquire a stack temperature, which is a temperature of the fuel cell stack;
an accessory configured to consume generated electric power of the fuel cell stack, and
a controller programmed to control the fuel cell system, wherein the controller is programmed to,
when the stack temperature is equal to or lower than a predetermined first threshold temperature at a time of startup of the fuel cell system, control a heat generation amount per unit time of the fuel cell stack to a set heat generation amount to perform a warming-up operation until the stack temperature increases to a target temperature,
when the stack temperature is equal to or higher than a predetermined second threshold temperature, execute at least one of:
(i) setting the target temperature to be lower than the target temperature when the stack temperature is lower than the second threshold temperature, or
(ii) setting the set heat generation amount to be smaller than the set heat generation amount when the stack temperature is lower than the second threshold temperature, and drive the accessory after the warming-up operation when the target temperature is lower than a predetermined third threshold temperature.

* * * * *